(12) United States Patent
Arana et al.

(10) Patent No.: US 12,395,690 B2
(45) Date of Patent: Aug. 19, 2025

(54) ACCESSIBILITY ENHANCED CONTENT DELIVERY

(71) Applicant: Disney Enterprises, Inc., Burbank, CA (US)

(72) Inventors: Mark Arana, Agoura Hills, CA (US); Katherine S. Navarre, Los Angeles, CA (US); Michael A. Radford, Hansville, WA (US); Joseph S. Rice, Berkeley, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 17/735,926

(22) Filed: May 3, 2022

(65) Prior Publication Data

US 2022/0360839 A1 Nov. 10, 2022

Related U.S. Application Data

(60) Provisional application No. 63/187,837, filed on May 12, 2021, provisional application No. 63/184,692, filed on May 5, 2021.

(51) Int. Cl.
*H04N 21/43* (2011.01)
*G06T 13/40* (2011.01)
(Continued)

(52) U.S. Cl.
CPC ......... *H04N 21/4316* (2013.01); *G06T 13/40* (2013.01); *G06T 13/80* (2013.01);
(Continued)

(58) Field of Classification Search
CPC ...... H04N 7/147; H04N 7/157; H04N 13/383; H04N 21/454; H04N 7/142; H04N 1/00307; H04N 13/398; H04N 2101/00
See application file for complete search history.

(56) References Cited

U.S. PATENT DOCUMENTS 6,327,272 B1    12/2001  Van Steenbrugge
6,483,532 B1    11/2002  Girod
(Continued)

FOREIGN PATENT DOCUMENTS

WO    2018052901    3/2018
WO    2019157344    8/2019

OTHER PUBLICATIONS

"Guidelines for positioning of sign language interpreters in conferences, including web-streaming" Sign Language Network. Dec. 21, 2016. pp. 1-6.
(Continued)

*Primary Examiner* — Samira Monshi
(74) *Attorney, Agent, or Firm* — Farjami & Farjami LLP

(57) ABSTRACT

A system for delivering accessibility enhanced content includes a computer server having processing hardware and a memory storing a software code. The processing hardware is configured to execute the software code to deliver, to a user system, accessibility enhanced content comprising primary content and an accessibility track synchronized to the primary content, the accessibility track including at least one of a sign language performance, or one or more video tokens each expressing one or more words. When the accessibility track includes the sign language performance, the sign language performance is delivered contemporaneously with delivery of the primary content. When the accessibility track includes the one or more video tokens, the one or more video tokens are played back when the primary content reaches a location corresponding to each of the one or more video tokens.

16 Claims, 7 Drawing Sheets

(51) Int. Cl.
*G06T 13/80* (2011.01)
*G09B 21/00* (2006.01)
*G11B 27/10* (2006.01)
*H04N 21/431* (2011.01)
*H04N 21/439* (2011.01)
*H04N 21/44* (2011.01)
*H04N 21/472* (2011.01)
*G10L 21/10* (2013.01)
*H04N 21/488* (2011.01)

(52) U.S. Cl.
CPC ............ *G09B 21/009* (2013.01); *G11B 27/10* (2013.01); *H04N 21/43074* (2020.08); *H04N 21/4394* (2013.01); *H04N 21/44008* (2013.01); *H04N 21/47202* (2013.01); *G10L 21/10* (2013.01); *H04N 21/488* (2013.01)

(56) References Cited

U.S. PATENT DOCUMENTS

| | | | | |
|---|---|---|---|---|
| 6,545,685 | B1 * | 4/2003 | Dorbie | H04N 9/3147 348/383 |
| 7,827,547 | B1 | 11/2010 | Sutherland et al. | |
| 7,827,574 | B1 | 11/2010 | Hendricks et al. | |
| 8,566,075 | B1 | 10/2013 | Bruner | |
| 9,215,514 | B1 | 12/2015 | Kline | |
| 10,289,903 | B1 | 5/2019 | Chandler | |
| 10,375,237 | B1 | 8/2019 | Williams et al. | |
| 10,514,766 | B2 | 12/2019 | Gates et al. | |
| 2002/0104083 | A1 * | 8/2002 | Hendricks | H04N 21/4316 348/E5.103 |
| 2005/0097593 | A1 | 5/2005 | Raley et al. | |
| 2006/0018254 | A1 | 1/2006 | Sanders | |
| 2009/0141793 | A1 | 6/2009 | Gramelspacher et al. | |
| 2009/0262238 | A1 | 10/2009 | Hope et al. | |
| 2010/0254408 | A1 | 10/2010 | Kuno | |
| 2011/0096232 | A1 | 4/2011 | Dewa et al. | |
| 2011/0157472 | A1 * | 6/2011 | Keskinen | G09B 21/009 348/E3.001 |
| 2011/0162021 | A1 | 6/2011 | Lee | |
| 2013/0141551 | A1 * | 6/2013 | Kim | H04N 5/445 348/51 |
| 2014/0046661 | A1 | 2/2014 | Bruner | |
| 2014/0242955 | A1 | 8/2014 | Kang et al. | |
| 2015/0163545 | A1 | 6/2015 | Freed et al. | |
| 2015/0317304 | A1 | 11/2015 | An et al. | |
| 2015/0317307 | A1 | 11/2015 | Mahkovec et al. | |
| 2015/0350139 | A1 | 12/2015 | Speer et al. | |
| 2015/0356788 | A1 * | 12/2015 | Abe | A63F 13/335 345/633 |
| 2016/0098850 | A1 | 4/2016 | Shintani et al. | |
| 2016/0191958 | A1 | 6/2016 | Nauseef et al. | |
| 2016/0198214 | A1 | 7/2016 | Levy et al. | |
| 2016/0294714 | A1 | 10/2016 | Persson et al. | |
| 2017/0006248 | A1 | 1/2017 | An et al. | |
| 2017/0111670 | A1 | 4/2017 | Ducloux et al. | |
| 2017/0132828 | A1 | 5/2017 | Zelenin et al. | |
| 2018/0063325 | A1 | 3/2018 | Wilcox et al. | |
| 2018/0075659 | A1 | 3/2018 | Browy | |
| 2019/0052473 | A1 * | 2/2019 | Soni | G09B 21/009 |
| 2019/0096407 | A1 | 3/2019 | Lambourne et al. | |
| 2019/0213401 | A1 | 7/2019 | Kuang | |
| 2019/0251344 | A1 | 8/2019 | Menefee | |
| 2020/0294525 | A1 | 9/2020 | Santos et al. | |
| 2021/0241309 | A1 | 8/2021 | Wolf, Jr. | |
| 2021/0352380 | A1 | 11/2021 | Duncan et al. | |
| 2022/0141547 | A1 | 5/2022 | Plunkett, Jr. | |
| 2022/0171960 | A1 | 6/2022 | Nelson et al. | |
| 2022/0327309 | A1 | 10/2022 | Carlock et al. | |
| 2022/0335971 | A1 | 10/2022 | Gruszka et al. | |
| 2022/0343576 | A1 * | 10/2022 | Marey | G10L 25/63 |

OTHER PUBLICATIONS

"Sign Language Video Encoding for Digital Cinema" ISDCF Document 13. Jul. 18, 2018 pp. 1-6.
International Search Report and Written Opinion for International Application PCT/US2022/027717 dated Jul. 15, 2022.
International Search Report and Written opinion dated Jul. 13, 2022 for International Application PCT/US2022/027716.
International Search Report and Written opinion dated Jul. 15, 2022 for International Application PCT/US2022/027717.
International Search Report and Written opinion dated Jul. 15, 2022 for International Application PCT/US2022/027719.
International Search Report and Written opinion dated Aug. 9, 2022 for International Application PCT/US2022/027713.
"Guidelines for Positioning of Sign Language Interpreters in Conferences, Including Web-Streaming: Proper spatial organization enhances communication when SLI is used in meetings. These simple steps will help you realize your goals." Sign Language Network. Published Dec. 21, 2016. Last updated: Dec. 12, 2016. 6 pgs.
ISDCF: "Sign Language Video Encoding for Digital Cinema" Jul. 18, 2018 pp. 1-6.
Daniel Jones "Demystifying Audio Watermarking, Fingerprinting and Modulation." Published Jan. 19, 2017. 10 pgs.
Tiago Maritan U. de Araujo, Felipe L.S. Ferreira, Danilo A.N.S. Silva, Leonardo D. Oliveira, Eduardo L. Falcao, Leonardo A. Domingues, Vandhuy F. Martins, Igor A.C. Portela, Yurika S. Nobrega, Hozana R.G. Lima, Guido L. Souza Filho, Tatiana A. Tavares, Alexandra N. Duarte "An Approach to Generate and Embed Sign Language Video Tracks Into Multimedia Contents" Information Sciences vol. 281, Oct. 10, 2014 7 Pgs.
International Search Report & Written Opinion for International Application PCT/US2022/025123, dated Jul. 4, 2022.
ISDCF Doc4-16-Channel Audio Packaging Guide obtained from https://files.isdcf.com/papers/ISDCF-Doc4-Audio-channel-recommendations.pdf (2017).
File History of U.S. Appl. No. 17/735,907, filed May 3, 2022.
File History of U.S. Appl. No. 17/735,920, filed May 3, 2022.
File History of U.S. Appl. No. 17/735,935, filed May 3, 2022.
File History of U.S. Appl. No. 17/506,054, filed Oct. 20, 2021.
Habili, et al. "Segmentation of the face and hands in sign language video sequences using color and motion cues." Aug. 2004. IEEE Transactions on Circuits and Systems for Video Technology, vol. 14(8), pp. 1086-1097. (Year: 2004).

* cited by examiner

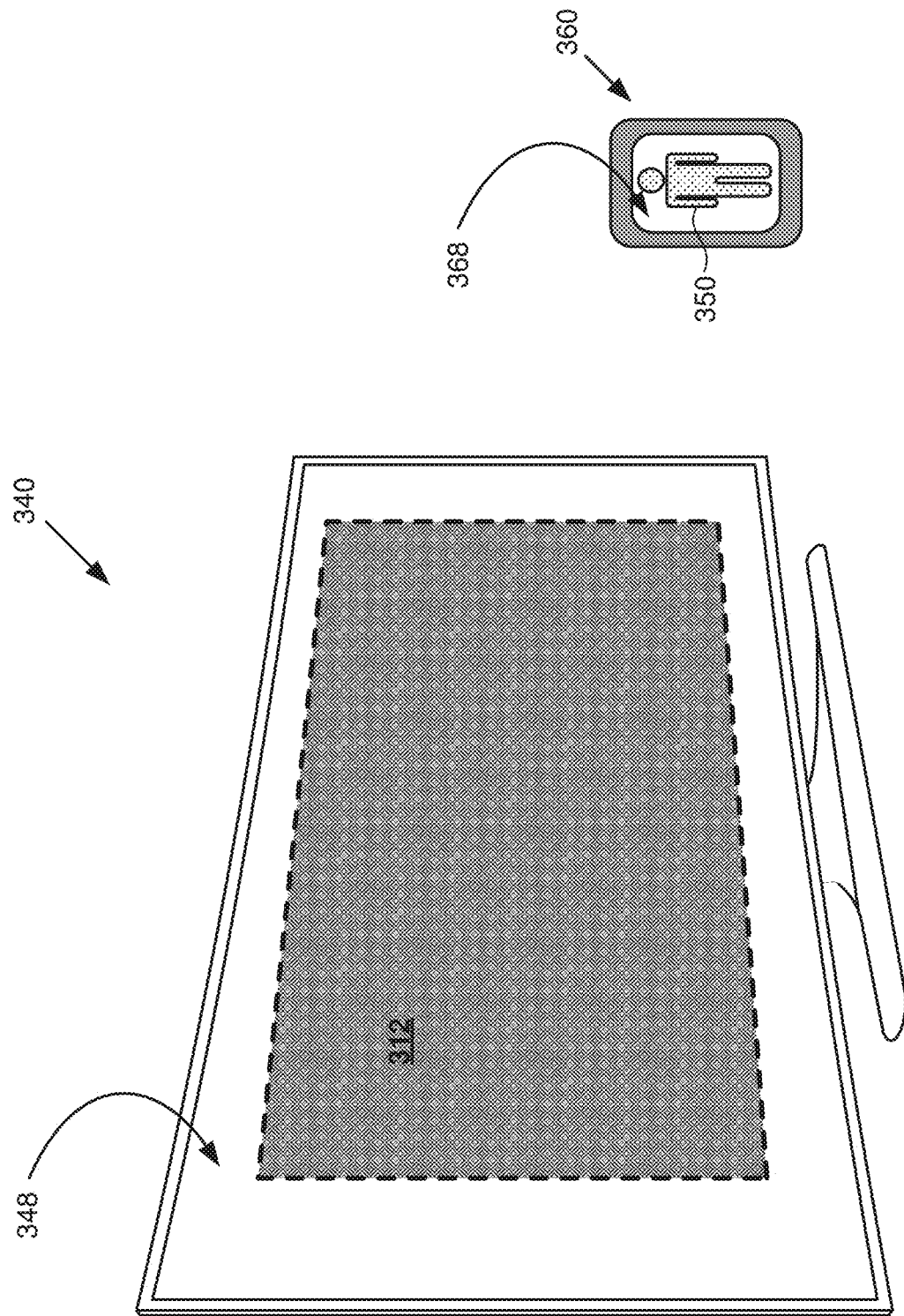

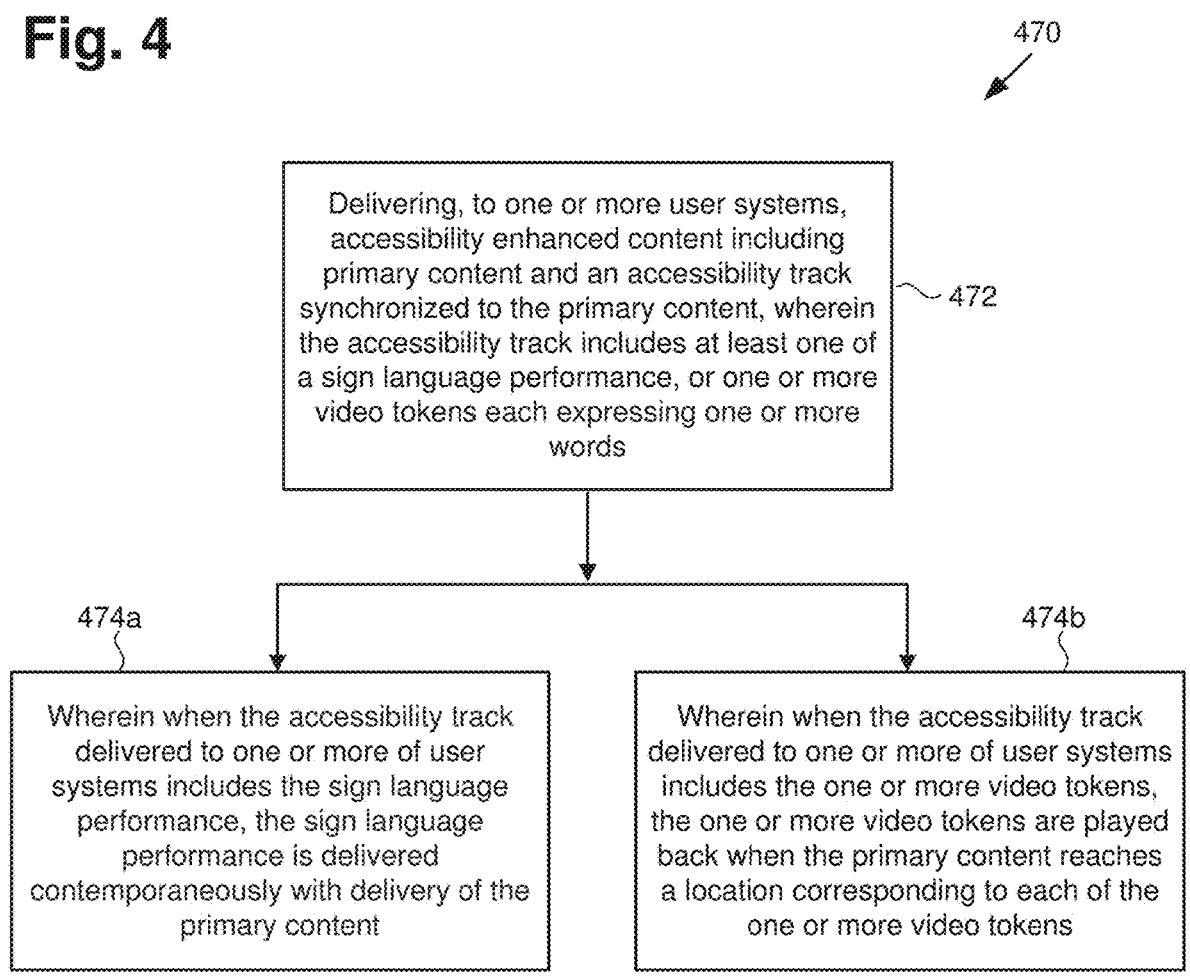

ACCESSIBILITY ENHANCED CONTENT DELIVERY

RELATED APPLICATIONS

The present application claims the benefit of and priority to Provisional Patent Application Ser. No. 63/184,692, filed on May 5, 2021, and titled "Distribution of Sign Language Enhanced Content," and to Provisional Patent Application Ser. No. 63/187,837 filed on May 12, 2021, and titled "Delivering Sign Language Content for Media Content," which are both hereby incorporated fully by reference into the present application. The present application is also related to U.S. patent application Ser. No. 17/735,907, titled "Distribution of Sign Language Enhanced Content," U.S. patent application Ser. No. 17/735,920, titled "Accessibility Enhanced Content Creation," and U.S. patent application Ser. No. 17/735,935, titled "Accessibility Enhanced Content Rendering," all filed concurrently with the present application, and all are hereby incorporated fully by reference into the present application.

BACKGROUND

A variety of accessibility features, such as vision compensation, hearing assistance, and neurodiversity tools, for example, can greatly improve the experience of interacting with media content for persons experiencing disabilities. As a specific example, members of the deaf and hearing impaired communities often rely on any of a number of signed languages for communication via hand signals. Although effective in translating the plain meaning of a communication, hand signals alone typically do not fully capture the emphasis or emotional intensity motivating that communication. Accordingly, skilled human sign language translators tend to employ multiple physical modes when communicating information. Those modes may include gestures other than hand signals, postures, and facial expressions, as well as the speed and force with which such expressive movements are executed.

For a human sign language translator, identification of the appropriate emotional intensity and emphasis to include in a signing performance may be largely intuitive, based on cognitive skills honed unconsciously as the understanding of spoken language is learned and refined through childhood and beyond. However, the exclusive reliance on human sign language translation can be expensive, and in some use cases may be inconvenient or even impracticable, while analogous challenges to the provision of vision compensated and neurodiversity sensitive content exist. Consequently, there is a need in the art for an efficient and scalable solution for delivering accessibility enhanced content.

BRIEF DESCRIPTION OF THE DRAWINGS

FIG. 3C shows another exemplary implementation in which an accessibility enhancement to content is provided to one or more, but less than all viewers of the content;

FIG. 4 shows a flowchart outlining an exemplary method for delivering accessibility enhanced content, according to one implementation.

DETAILED DESCRIPTION

Figure 1:
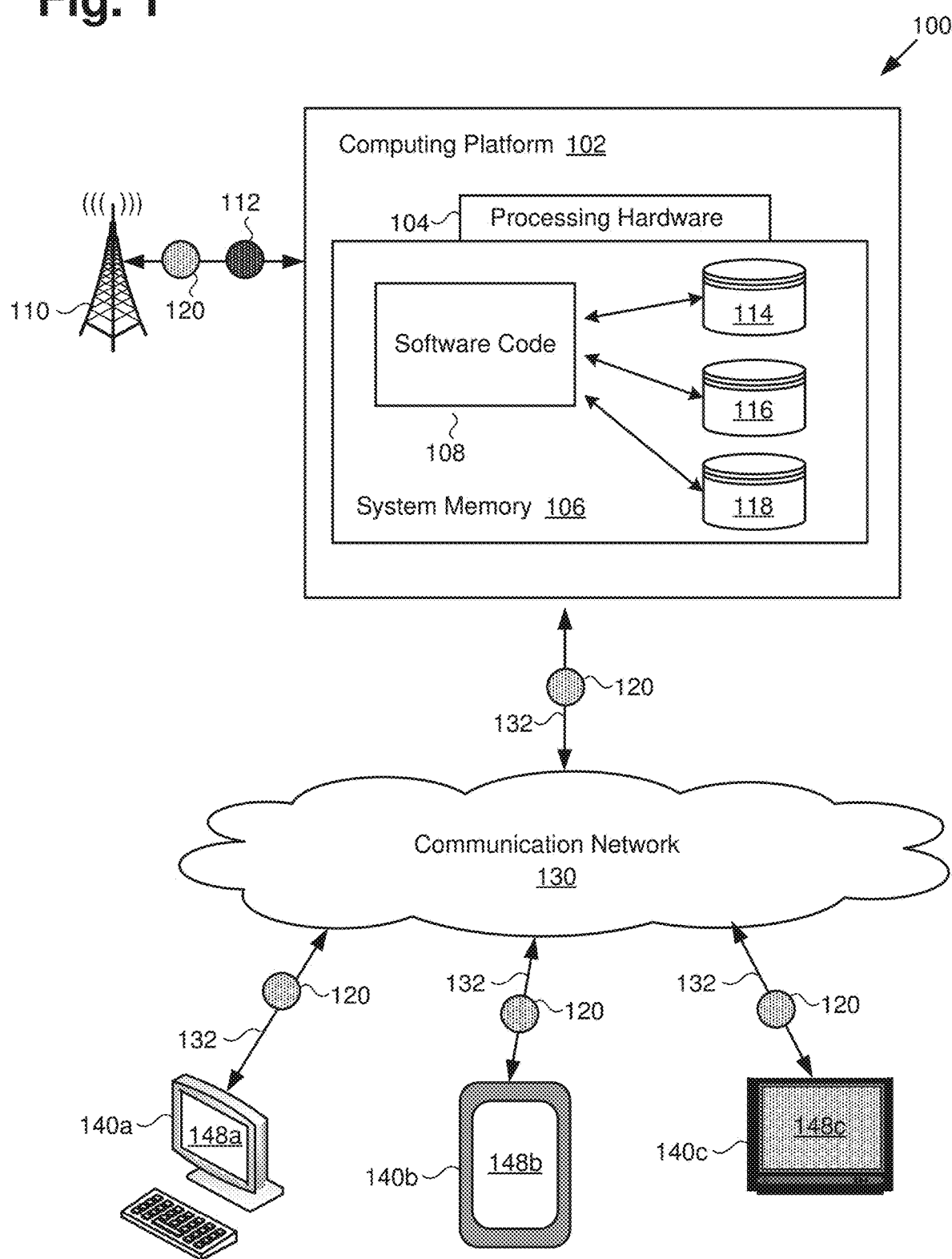
FIG. 1 shows a diagram of an exemplary system for delivering accessibility enhanced content, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for delivering accessibility enhanced content. It is noted that although the present content enhancement solution is described below in detail by reference to the exemplary use case in which sign language is used to enhance audio-video content having both audio and video components, the present novel and inventive principles may be advantageously applied to video unaccompanied by audio, as well as to audio content unaccompanied by video. In addition, or alternatively, in some implementations, the type of content that is accessibility enhanced according to the present novel and inventive principles may be or include digital representations of persons, fictional characters, locations, objects, and identifiers such as brands and logos, for example, which populate a virtual reality (VR), augmented reality (AR), or mixed reality (MR) environment. Moreover, in some implementations, that content may depict virtual worlds that can be experienced by any number of users synchronously and persistently, while providing continuity of data such as personal identity, user history, entitlements, possessions, payments, and the like. It is noted that the accessibility enhancement solution disclosed by the present application may also be applied to content that is a hybrid of traditional audio-video and fully immersive VR/AR/MR experiences, such as interactive video.

It is further noted that, as defined in the present application, the expression "sign language" refers to any of a number of signed languages relied upon by the deaf community and other hearing impaired persons for communication via hand signals, facial expressions, and in some cases larger body motions or postures. Examples of sign languages within the meaning of the present application include sign languages classified as belonging to the American Sign Language (ASL) cluster, Brazilian sign Language (LIBRAS), the French Sign Language family, Indo-Pakistani Sign Language, Chinese Sign Language, the Japanese Sign Language family, and the British, Australian, and New Zealand Sign Language (BANZSL) family, to name a few.

It is also noted that although the present content enhancement solution is described below in detail by reference to the exemplary use case in which a sign language performance is used to enhance content, the present novel and inventive principles may also be applied to content enhancement through the use of an entire suite of accessibility enhancements. Examples of such accessibility enhancements include assisted audio, forced narratives, subtitles, captioning, and the provision of haptic effects, to name a few. Moreover, in some implementations, the systems and methods disclosed by the present application may be substantially or fully automated.

As used in the present application, the terms "automation," "automated," and "automating" refer to systems and processes that do not require the participation of a human analyst or editor. Although, in some implementations, a human system administrator may sample or otherwise review the accessibility enhanced content distributed by the automated systems and according to the automated methods described herein, that human involvement is optional. Thus, the methods described in the present application may be performed under the control of hardware processing components of the disclosed automated systems.

It is also noted that, as defined in the present application, the expression "machine learning model" may refer to a mathematical model for making future predictions based on patterns learned from samples of data or "training data." For example, machine learning models may be trained to perform image processing, natural language processing (NLP), and other inferential processing tasks. Various learning algorithms can be used to map correlations between input data and output data. These correlations form the mathematical model that can be used to make future predictions on new input data. Such a predictive model may include one or more logistic regression models, Bayesian models, or artificial neural networks (NNs). A "deep neural network," in the context of deep learning, may refer to a NN that utilizes multiple hidden layers between input and output layers, which may allow for learning based on features not explicitly defined in raw data. As used in the present application, a feature identified as a NN refers to a deep neural network.

FIG. 1 shows exemplary system 100 for delivering accessibility enhanced content, according to one implementation. As shown in FIG. 1, system 100 includes computing platform 102 having processing hardware 104 and system memory 106 implemented as a computer-readable non-transitory storage medium. According to the present exemplary implementation, system memory 106 stores software code 108 that may include one or more machine learning models, as well as performer database 114, word string database 116, and video tokens database 118.

As further shown in FIG. 1, system 100 is implemented within a use environment including content source 110 providing primary content 112 to system 100 and receiving accessibility enhanced content 120 corresponding to primary content 112 from system 100. With respect to the feature "performer database," as defined for the purposes of the present application the term "performer" refers to a digital representation of an actor, or a virtual character such as an animated model or cartoon for example, that delivers or "performs" an accessibility enhancement, such as narration, voice-over, or a sign language interpretation of primary content 112. In addition, as defined for the purposes of the present application, the feature "word string" may refer to a single word or a phrase including a sequence of two or more words. Moreover, in some implementations, a word string entry in word string data base 116 may include, in addition to a particular word string, one or more of the probability of that word string corresponding to a particular emotive state, physical gestures or facial expressions corresponding to the word string, or haptic effects associated with the word string.

Regarding the feature "video token," it is noted that as defined in the present application, a "video token" refers to a snippet of video content including a predetermined accessibility enhancement. In the exemplary use case of content enhanced by a performance of a sign language translation (hereinafter "sign language performance"), for example, single word signs, certain commonly used sequences of signs, or commonly recognized shorthand representations of lengthy sequences of signs may be pre-produced as video tokens to be played back when primary content 112 reaches a location corresponding respectively to each video token. That is to say, each video token may express one or more words. Furthermore, in some implementations, such video tokens may be displayed as picture-in-picture (PiP) overlays on primary content 112.

As depicted in FIG. 1, in some use cases, content source 110 may find it advantageous or desirable to make primary content 112 available via an alternative distribution mode, such as communication network 130, which may take the form of a packet-switched network, for example, such as the Internet. For instance, system 100 may be utilized by content source 110 to distribute accessibility enhanced content 120 including primary content 112 as part of a content stream, which may be an Internet Protocol (IP) content stream provided by a streaming service, or a video-on-demand (VOD) service.

The use environment of system 100 also includes user systems 140a, 140b, and 140c (hereinafter "user systems 140a-140c") receiving accessibility enhanced content 120 from system 100 via communication network 130. With respect to user systems 140a-140c, it is noted that although FIG. 1 depicts three user systems, that representation is merely by way of example. In other implementations, user systems 140a-140c may include as few as one user system, or more than three user systems.

Also shown in FIG. 1 are network communication links 132 of communication network 130 interactively connecting system 100 with user systems 140a-140c, as well as displays 148a, 148b, and 148c (hereinafter "displays 148a-148c") of respective user systems 140a-140c. As discussed in greater detail below, accessibility enhanced content 120 includes primary content 112 as well as an accessibility track synchronized to primary content 112. In some implementations, for example, such an accessibility track may include imagery depicting a performance of a sign language translation of primary content 112 for rendering on one or more of displays 148a-148c.

Although the present application refers to software code 108, performer database 114, word string database 116, and video tokens database 118 as being stored in system memory 106 for conceptual clarity, more generally, system memory 106 may take the form of any computer-readable non-transitory storage medium. The expression "computer-readable non-transitory storage medium," as used in the present application, refers to any medium, excluding a carrier wave or other transitory signal that provides instructions to processing hardware 104 of computing platform 102 or to respective processing hardware of user systems 140a-140c. Thus, a computer-readable non-transitory storage medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs such as DVDs, RAM, programmable read-only memory (PROM), erasable PROM (EPROM), and FLASH memory.

Moreover, although FIG. 1 depicts to software code 108, performer database 114, word string database 116, and video tokens database 118 as being co-located in system memory 106, that representation is also provided merely as an aid to conceptual clarity. More generally, system 100 may include one or more computing platforms 102, such as computer servers for example, which may be co-located, or may form an interactively linked but distributed system, such as a cloud-based system, for instance. As a result, processing hardware 104 and system memory 106 may correspond to distributed processor and memory resources within system 100. Consequently, in some implementations, one or more of software code 108, performer database 114, word string database 116, and video tokens database 118 may be stored remotely from one another on the distributed memory resources of system 100.

Processing hardware 104 may include multiple hardware processing units, such as one or more central processing units, one or more graphics processing units, and one or more tensor processing units, one or more field-programmable gate arrays (FPGAs), custom hardware for machine-learning training or inferencing, and an application programming interface (API) server, for example. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of computing platform 102, as well as a Control Unit (CU) for retrieving programs, such as software code 108, from system memory 106, while a GPU may be implemented to reduce the processing overhead of the CPU by performing computationally intensive graphics or other processing tasks. A TPU is an application-specific integrated circuit (ASIC) configured specifically for artificial intelligence (AI) processes such as machine learning.

In some implementations, computing platform 102 may correspond to one or more web servers accessible over a packet-switched network such as the Internet, for example. Alternatively, computing platform 102 may correspond to one or more computer servers supporting a wide area network (WAN), a local area network (LAN), or included in another type of private or limited distribution network. In addition, or alternatively, in some implementations, system 100 may utilize a local area broadcast method, such as User Datagram Protocol (UDP) or Bluetooth, for instance. Furthermore, in some implementations, system 100 may be implemented virtually, such as in a data center. For example, in some implementations, system 100 may be implemented in software, or as virtual machines.

It is further noted that, although user systems 140a-140c are shown variously as desktop computer 140a, smartphone 140b, and smart television (smart TV) 140c, in FIG. 1, those representations are provided merely by way of example. In other implementations, user systems 140a-140c may take the form of any suitable mobile or stationary computing devices or systems that implement data processing capabilities sufficient to provide a user interface, support connections to communication network 130, and implement the functionality ascribed to user systems 140a-140c herein. That is to say, in other implementations, one or more of user systems 140a-140c may take the form of a laptop computer, tablet computer, digital media player, game console, or a wearable communication device such as a smartwatch, AR viewer, or VR headset, to name a few examples. It is also noted that displays 148a-148c may take the form of liquid crystal displays (LCDs), light-emitting diode (LED) displays, organic light-emitting diode (OLED) displays, quantum dot (QD) displays, or any other suitable display screens that perform a physical transformation of signals to light.

In some implementations, content source 110 may be a media entity providing primary content 112. Primary content 112 may include content from a linear TV program stream, for example, that includes a high-definition (HD) or ultra-HD (UHD) baseband video signal with embedded audio, captions, time code, and other ancillary metadata, such as ratings and/or parental guidelines. In some implementations, primary content 112 may also include multiple audio tracks, and may utilize secondary audio programming (SAP) and/or Descriptive Video Service (DVS), for example. Alternatively, in some implementations, primary content 112 may be video game content. As yet another alternative, and as noted above, in some implementations primary content 112 may be or include digital representations of persons, fictional characters, locations, objects, and identifiers such as brands and logos, for example, which populate a VR, AR, or MR environment. Moreover and as further noted above, in some implementations primary content 112 may depict virtual worlds that can be experienced by any number of users synchronously and persistently, while providing continuity of data such as personal identity, user history, entitlements, possessions, payments, and the like. As also noted above, primary content 112 may be or include content that is a hybrid of traditional audio-video and fully immersive VR/AR/MR experiences, such as interactive video.

In some implementations, primary content 112 may be the same source video that is broadcast to a traditional TV audience. Thus, content source 110 may take the form of a conventional cable and/or satellite TV network, for example. As noted above, content source 110 may find it advantageous or desirable to make primary content 112 available via an alternative distribution mode, such as communication network 130, which may take the form of a packet-switched network, for example, such as the Internet, as also noted above. Alternatively, or in addition, although not depicted in FIG. 1, in some use cases accessibility enhanced content 120 may be distributed on a physical medium, such as a DVD, Blu-ray Disc®, or FLASH drive, for example.

Figure 2:
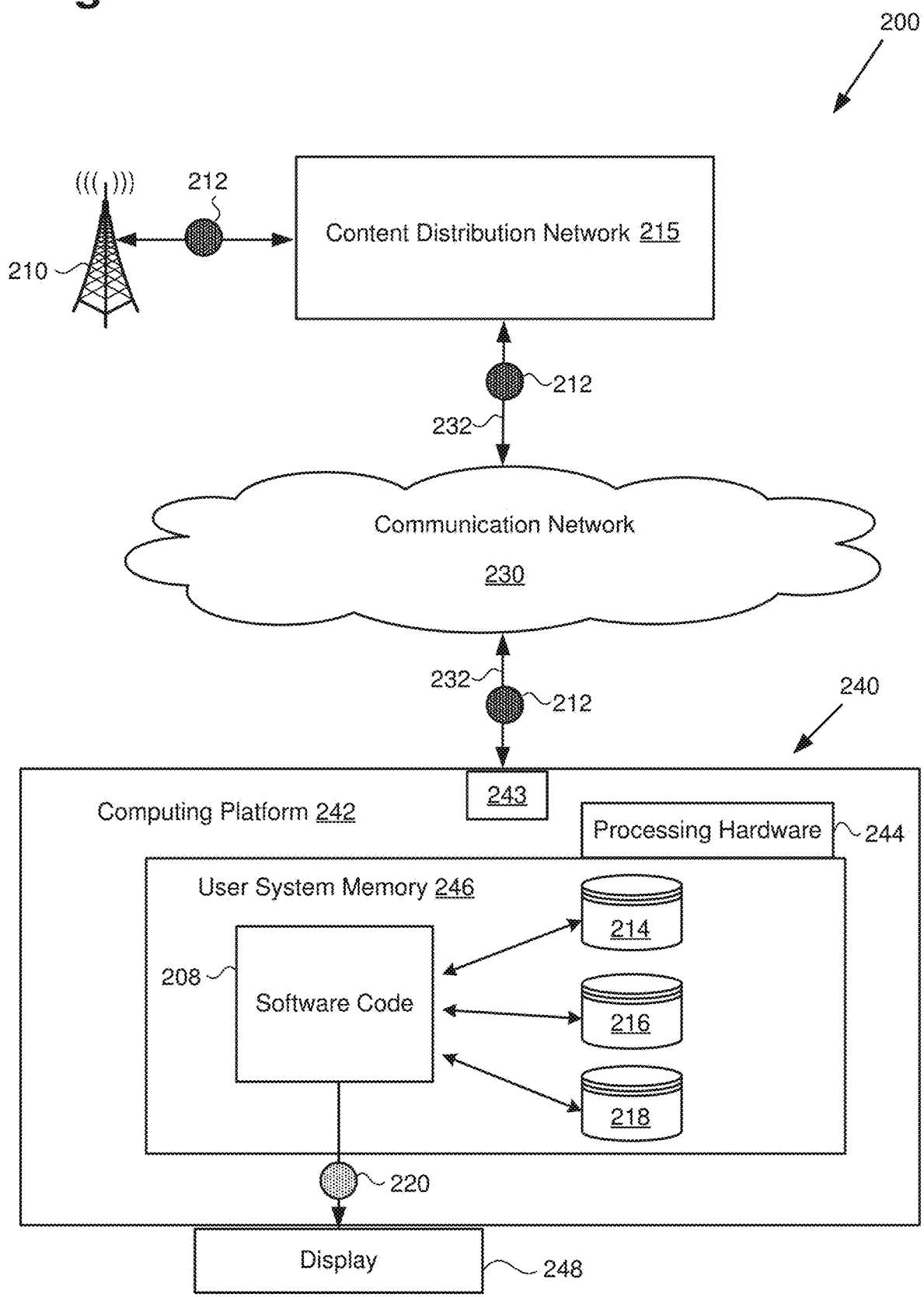
FIG. 2 shows a diagram of another exemplary implementation of a system for delivering accessibility enhanced content, according to one implementation.

FIG. 2 shows another exemplary system, i.e., user system 240, for use in delivering accessibility enhanced content, according to one implementation. As shown in FIG. 2, user system 240 includes computing platform 242 having transceiver 243, processing hardware 244, user system memory 246 implemented as a computer-readable non-transitory storage medium, and display 248. As further shown in FIG. 2, user system memory 246 stores software code 208, performer database 214, word string database 216, and video tokens database 218. With respect to display 248, it is noted that, in various implementations, display 248 may be physically integrated with user system 240 or may be communicatively coupled to but physically separate from user system 240. For example, where user system 240 is implemented as a smart TV, smartphone, laptop computer, tablet computer, or VR headset, display 240 will typically be integrated with user system 240. By contrast, where user system 240 is implemented as a desktop computer, display 240 may take the form of a monitor separate from computing platform 242 in the form of a computer tower.

As also shown in FIG. 2, user system 240 is utilized in use environment 200 including content source 210 providing primary content 212 to content distribution network 215, which in turn distributes primary content 212 to user system 240 via communication network 230 and network communication links 232. According to the implementation shown in FIG. 2, software code 208 stored in user system memory 246 of user system 240 is configured to receive primary content 212 and to output accessibility enhanced content 220 including primary content 212 for rendering on display 248.

Content source 210, primary content 212, accessibility enhanced content 220, communication network 230, and network communication links 232 correspond respectively in general to content source 110, primary content 112, accessibility enhanced content 120, communication network 130, and network communication links 132, in FIG. 1. In other words, content source 210, primary content 212, accessibility enhanced content 220, communication network 230, and network communication links 232 may share any of the characteristics attributed to respective content source 110, primary content 112, accessibility enhanced content 120, communication network 130, and network communication links 132 by the present disclosure, and vice versa.

User system 240 and display 248 correspond respectively in general to any or all of user systems 140a-140c and respective displays 148a-148c in FIG. 1. Thus, user systems 140a-140c and displays 148a-148c may share any of the characteristics attributed to respective user system 240 and display 248 by the present disclosure, and vice versa. That is to say, like displays 148a-148c, display 248 may take the form of an LCD, LED display, OLED display, or QD display, for example. Moreover, although not shown in FIG. 1, each of user systems 140a-140c may include features corresponding respectively to computing platform 242, transceiver 243, processing hardware 244, and user system memory 246 storing software code 208.

Transceiver 243 may be implemented as a wireless communication unit configured for use with one or more of a variety of wireless communication protocols. For example, transceiver 243 may be implemented as a fourth generation (4G) wireless transceiver, or as a 5G wireless transceiver. In addition, or alternatively, transceiver 243 may be configured for communications using one or more of WiFi, Bluetooth, Bluetooth LE, ZigBee, and 60 GHz wireless communications methods.

User system processing hardware 244 may include multiple hardware processing units, such as one or more CPUs, one or more GPUs, one or more TPUs, and one or more FPGAs, for example, as those features are defined above.

Software code 208, performer database 214, word string database 216, and video tokens database 218 correspond respectively in general to software code 108, performer database 114, word string database 116, and video tokens database 118, in FIG. 1. Thus, software code 208, performer database 214, word string database 216, and video tokens database 218, may share any of the characteristics attributed to respective software code 108, performer database 114, word string database 116, and video tokens database 118 by the present disclosure, and vice versa. In other words, like software code 108, software code 208 may include one or more machine learning models. Moreover, in implementations in which client processing hardware 244 executes software code 208 stored locally in user system memory 246, user system 240 may perform any of the actions attributed to system 100 by the present disclosure. Thus, in some implementations, software code 208 executed by processing hardware 244 of user system 240 may receive primary content 212 and may output accessibility enhanced content 220 including primary content 212 and an accessibility track synchronized to primary content 212.

Figure 3A:
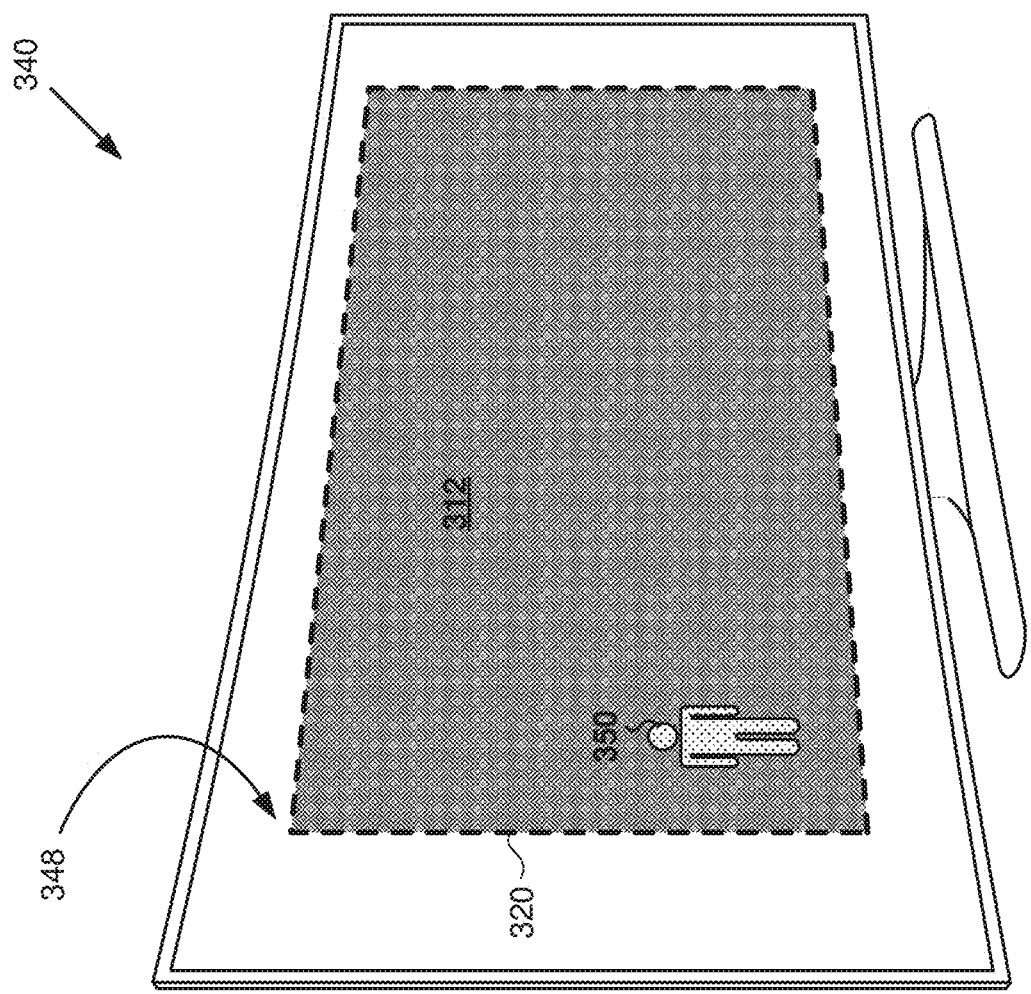
FIG. 3A shows an exemplary implementation in which accessibility enhanced content is provided to one or more viewers via a user system.

FIG. 3A shows an exemplary implementation in which accessibility enhanced content 320 is provided to one or more viewers via user system 340. As shown in FIG. 3A, accessibility enhanced content 320 includes primary content 312 and sign language performance 350 of primary content 312, shown as an overlay of primary content 312 on display 348. User system 340, display 348, primary content 312, and accessibility enhanced content 320 correspond respectively in general to user system(s) 140a-140c/240, display(s) 148a-148c/248, primary content 112/212, and accessibility enhanced content 120/220 in FIGS. 1 and 2. As a result, user system 340, display 348, primary content 312, and accessibility enhanced content 320 may share any of the characteristics attributed to respective user system(s) 140a-140c/240, display(s) 148a-148c/248, primary content 112/212, and accessibility enhanced content 120/220 by the present disclosure, and vice versa. That is to say, like display(s) 148a-148c/248, display 348 may take the form of an LCD, LED display, OLED display, QD display, or any other suitable display screen that performs a physical transformation of signals to light. In addition, although not shown in FIG. 3A, user system 340 may include features corresponding respectively to computing platform 242, processing hardware 244, and system memory storing software code 208, performer database 214, word string database 216, and video tokens database 218, in FIG. 2.

It is noted that although sign language performance 350 of primary content 312, is shown as an overlay of primary content 312, in FIG. 3A, that representation is merely exemplary. In other implementations, the display dimensions of primary content 112/212/312 may be reduced so as to allow sign language performance 350 of primary content 112/212312 to be rendered next to primary content 112/212/312, e.g., above, below, or laterally adjacent to primary content 112/212/312. Alternatively, in some implementations, sign language performance 350 of primary content 112/212/312 may be projected or otherwise displayed on a surface other than display 148a-148c/248/348, such as a projection screen or wall behind or next to user system 140a-140c/240/340, for example.

Sign language performance 350 of primary content 112/212/312 may be performed by a performer in the form of a digital representation of an actor a computer generated digital character (hereinafter "animated model"), such as an animated cartoon for example. For instance, software code 108/208 may be configured to programmatically interpret one or more of visual images, audio, a script, captions, subtitles, or metadata of primary content 112/212/312 into sign language hand signals, as well as other gestures, postures, and facial expressions communicating a message conveyed by primary content 112/212/312, and to perform that interpretation using the performer.

It is noted that background music with lyrics can be distinguished from lyrics being sung by a character using facial recognition, object recognition, activity recognition, or any combination of those technologies performed by software code 108/208, for example using one or more machine learning model-based analyzers included in software code 108/208. It is further noted that software code 108/208 may be configured to predict appropriate facial expressions and postures for execution by the performer during performance of sign language performance 350, as well as to predict the speed and forcefulness or emphasis with which the performer executes the performance of sign language performance 350.

Referring to FIGS. 1 and 3A in combination, in some implementations, processing hardware 104 of computing platform 102 may execute software code 108 to synchronize sign language performance 350 with a timecode of primary content 112/312 when producing accessibility enhanced content 120/320, and to record accessibility enhanced content 120/320, or to broadcast or stream accessibility enhanced content 120/320 to user system 140a-140c/340. In some of those implementations, sign language performance 350 may be pre-rendered by system 100 and broadcasted or streamed to user system 148a-148c/340. However, in other implementations in which accessibility enhanced content 120/320 including primary content 112/312 and sign language performance 350 are broadcasted or streamed to user system 140a-140c/340, processing hardware 104 may execute software code 108 to generate sign language performance 350 dynamically during the recording, broadcasting, or streaming of primary content 112/312.

Further referring to FIG. 2, in yet other implementations in which primary content 212/312 is broadcasted or streamed to user system 240/340, processing hardware 244 of user system 240/340 may execute software code 208 to generate sign language performance 350 locally on user system 240/340, and to do so dynamically during play back of primary content 212/312. Processing hardware 244 of user system 240/340 may further execute software code 208 to render the sign language performance 350 on display 248/348 contemporaneously with rendering primary content 212/312.

In some implementations, a pre-rendered version of sign language performance 350, or facial points and other digital character landmarks for use in executing sign language performance 350 dynamically by the performer may be included in an accessibility track synchronized to primary content 212/312 and transmitted to user system(s) 140a-140c/240/340 using the same communication channel used to send and receive primary content 112/212/312. However, in other implementations, that accessibility track may be transmitted to user system(s) 140a-140c/240/340 using a separate communication channel than that used to send and receive primary content 112/212/312. In one such implementation, the data for use in performing sign language performance 350 may be generated by software code 108 on system 100, and may be transmitted to user system(s) 140a-140c/240/340. In other implementations, the data for use in performing sign language performance 350 may be generated locally on user system 240/340 by software code 208, executed by processing hardware 244.

According to some implementations, multiple channels can be used to transmit sign language performance 350. For example, in some use cases primary content may include dialogue including multiple interactive conversations among two or more participant. In some such use cases, sign language performance 350 may include multiple performers, each corresponding respectively to one of the multiple participants. Moreover, in some use cases, the performance by each individual performer may be transmitted to user system(s) 140a-140c/240/340 on separate communication channels.

In some implementations, it may be advantageous or desirable to enable a user of user system(s) 140a-140c/240/340 to affirmatively select a particular performer to perform sign language performance 350 from a predetermined cast of selectable performers. In those implementations, a child user could select an age appropriate performer different from a performer selected by an adult user. Alternatively, or in addition, the cast of selectable performers may vary depending on the subject matter of primary content 112/212/312. For instance, where primary content 112/212/312 portrays a sporting event, the selectable or default performer for performing sign language performance 350 may depict athletes, while actors or fictional characters may be depicted by sign language performance 350 when primary content 112/212/312 is a movie or episodic TV content.

In some implementations, sign language performance 350 may include a full-length video of a performer signing the audio of primary content 112/212/312, or can include a set of short video tokens each depicting single word signs, certain commonly used sequences of signs, or commonly recognized shorthand representations of lengthy sequences of signs, as noted above. Primary content 112/212/312 may have a dedicated layer for delivering sign language performance 350. Where sign language performance 350 includes the full-length video, sign language performance 350 may be streamed contemporaneously with streaming of primary content 112/212/312, and may be synchronized to a subtitle track of primary content 112/212/312, for example. In some implementations, such a dedicated sign language layer can be toggled on/off. Where sign language performance 350 includes a set of video tokens, those video tokens may be delivered to and stored on user system(s) 140a-140c/240/340, and a video token can be played back when the subtitle track reaches a corresponding word or phrase, for example. In some implementations, sign language performance 350 may be displayed as a PiP overlay on primary content 112/212/312 that can be repositioned or toggled on/off based on a user selection. The PiP overlay of sign language performance 350 can employ alpha masking (green-screening) to show only the performer of sign language performance 350, or the performer having an outline added for contrast.

In some implementations, sign language performance 350 may be derived from audio of primary content 112/212/312 using natural language processing (NLP). Sign language performance 350 may also be derived from subtitles or closed captioning of primary content 112/212/312 using text recognition. In some implementations, sign language performance 350 may be computer generated and displayed utilizing an animated model, as noted above. Instructions for rendering the animated model and its animations may be delivered to user system(s) 140a-140c/240/340, and the animated model may be rendered on user system(s) 140a-140c/240/340. Alternatively, the animated model and its animations may be partially or fully pre-rendered and delivered to user system(s) 140a-140c/240/340. Bandwidth and caching capabilities can be determined before delivering pre-rendered models or animations. The animated model and its animations may be display as a PiP overlay.

Video tokens database 118 of system 100, or video tokens database 218 of user system(s) 140a-140c/240/340 may include animated performances of commonly used signs with multiple performances available for each sign or sequence of signs depending on the emotion of the performance. The choice of which performance is selected for a given word or phrase could then be determined by another data set that is delivered to user system(s) 140a-140c/240/340. The performances may be captured for a standard humanoid rig or multiple humanoid rigs with varying proportions, and then dynamically applied to any animated model with the same proportions, as a way to allow a programmer or user to select which animated model will perform the sign.

In implementations in which primary content 112/212/312 includes location information, such as from sports cameras or other two-dimensional (2D) or three-dimensional (3D) cameras, a performer for performing sign language performance 350 may be inserted into primary content 112/212/312, rather than simply overlaid on primary content 112/212/312. For example, the performer could be inserted into primary content 112/212/312 at various depths, or behind various objects. The performer inserted into primary content 112/212/312 could appear to maintain its respective orientation, e.g., facing a football field, as the camera moves in a given scene, or could change its orientation during the scene to always face the camera. Where primary content 112/212/312 includes color awareness, such as Dolby Vision®, the performer may dynamically adapt to colors of primary content 112/212/312. For example, grading can be applied to the performer in order for the performer to blend in with primary content 112/212/312, or grading can be removed from the performer in order to create contrast with primary content 112/212/312. The performer may continually adapt to different colors as primary content 112/212/312 plays. As another example, where a sign language performance 350 PiP overlay is located in the bottom right of display 148a-148c/248/348, as action begins to occur in the bottom right, the PiP overlay can be relocated to the bottom left.

In some implementations, a first data set may be utilized to control the performer to perform signing, e.g., with its hands and arms. The first data set can be derived from primary content 112/212/312, e.g., from text recognition of the subtitles, closed captioning, NLP of the audio, or any combination thereof. A second data set (hereinafter "emotive data set") can be utilized to control the performer to perform emotions. e.g., facial expressions and other gestures. The emotive data set can be derived from facial scanning or similar technologies. The emotive data set may also be derived from expression metadata tags in an expressions track of primary content 112/212/312. Expression metadata tags may be manually added by editors. Over time, machine learning can be utilized to automate generation of expression metadata tags. The emotive data set can also be derived from audio recognition of primary content 112/212/312. For example, if audio data detects an emotional song, the performer may perform more emotional facial expression. As noted above, system 100 may include video tokens database 118, or user system(s) 140a-140c/240/340 may include video tokens database 218, of performances of commonly used signs or sequences of signs, with multiple performances available for each sign or sequence of signs depending on the emotion of the performance. The choice of which performance is selected for a given word could then be determined using the emotive data set.

In some implementations, the accessibility track synchronized to primary content 112/212/312 may include dedicated channels for senses other than hearing and sight, such as a dedicated haptics effects channel. That is to say, in some implementations, the accessibility track synchronized to primary content 112/212/312 may further include one or more haptic effects to be actuated when primary content 112/212/312 reaches a location corresponding to each of those one or more haptic effects. Consequently, in those implementations, users may receive haptic effects based on what occurs in primary content 112/212/312. For example, an explosion sound can trigger a shaking haptic effect. Technologies being developed may allow for digital expressions of the sense of taste, and primary content 112/212/312 stream can include a dedicated taste channel.

As discussed above by reference to FIGS. 1 and 3A, in some implementations, processing hardware 104 of system 100 may execute software code 108 to broadcast or stream accessibility enhanced content 120/320 including the accessibility track carrying synchronized sign language performance 350 to user system(s) 140a-140c/340. In some of those implementations, sign language performance 350 may be pre-rendered by system 100 and the accessibility track including sign language performance 350 may be broadcasted or streamed to user system(s) 140a-140c/340. However, in other implementations in which primary content 112/312 and the accessibility track including sign language performance 350 are broadcasted or streamed to user system(s) 140a-140c/340, processing hardware 104 may execute software code 108 to generate sign language performance 350 dynamically during the recording, broadcasting, or streaming of primary content 112/312.

Referring to FIGS. 2 and 3A, in yet other implementations in which primary content 212/312 is broadcasted or streamed to user system 240/340, processing hardware 244 of user system 240/340 may execute software code 208 to generate sign language performance 350 locally on user system 240/340, and to do so dynamically during play back of primary content 112/212/312. Processing hardware 244 of user system 240/340 may further execute software code 208 to render the performance of sign language performance 350 on display 248/348 contemporaneously with rendering primary content 212/312 corresponding to sign language performance 350.

Figure 3B:
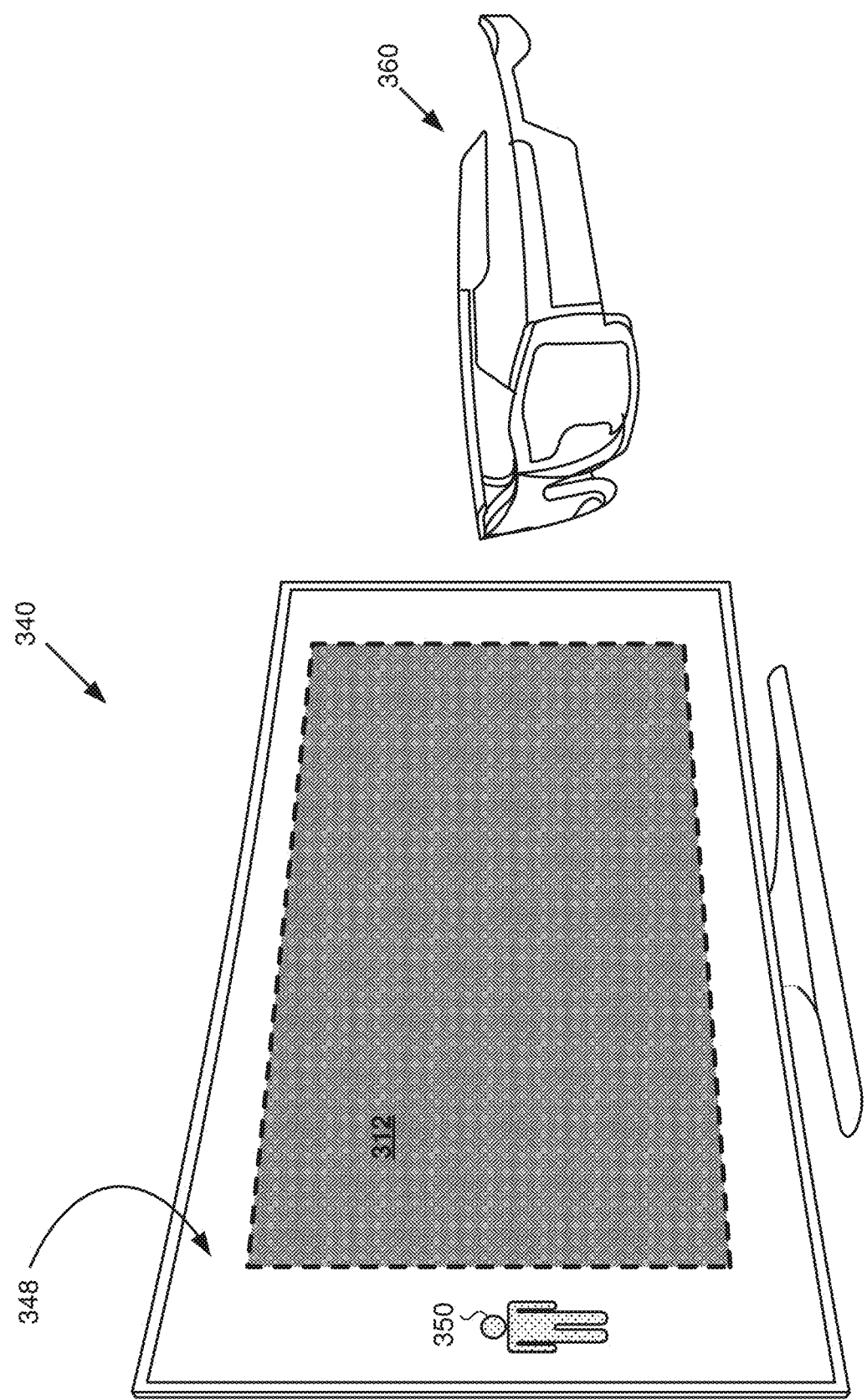
FIG. 3B shows an exemplary implementation in which an accessibility enhancement to content is provided to one or more, but less than all viewers of the content.

According to the exemplary implementation shown in FIG. 3A, sign language performance 350 is rendered on display 348 of user system 340 and is thus visible to all viewers of primary content 312 concurrently. However, in some use cases it may be advantageous or desirable to make an accessibility enhancement, such as sign language performance 350 for example, visible to one or more, but less than all of the viewers of user system 340. FIG. 3B shows such an implementation, according to one example. In addition to the features shown in FIG. 3A, FIG. 3B includes personal device 360 in the form of AR glasses for use by a user of user system 340. However, it is noted that more generally, personal device 360 may correspond to any AR viewing device, as well as to another type of personal device, such as a smartphone, tablet computer, smartwatch, and the like. In the implementation shown in FIG. 3B, sign language performance 350 is rendered on personal device 360 as an overlay on primary content 312 rendered on display 348 (similar to the illustration in FIG. 3A), or outside of primary content 312, such as beside primary content 312 (as illustrated in FIG. 3B), for example.

In some implementations, the performance of sign language performance 350 by an animated model, or facial points and other digital character landmarks for performing sign language performance 350 dynamically using the animated model may be transmitted to the AR glasses using a separate communication channel than that used to send and receive primary content 312. In one such implementation, the data for use in performing sign language performance 350 may be generated by software code 108 on system 100, and may be transmitted to the AR glasses wirelessly, such as via a 4G or 5G wireless channel. In other implementations, the data for use in performing sign language performance 350 may be generated locally on user system 340 by software code 208, executed by processing hardware 244, and may be transmitted to the AR glasses via one or more of WiFi, Bluetooth, ZigBee, and 60 GHz wireless communications methods.

According to some implementations, as noted above, multiple channels can be used to transmit sign language performance 350. For example, in some use cases primary content may include dialogue including multiple interactive conversations among two or more participant. In some such use cases, sign language performance 350 may include multiple performers, each corresponding respectively to one of the multiple participants. Moreover, in some use cases, the performance by each individual performer may be transmitted to the AR glasses on separate communication channels.

In some implementations, the AR glasses may recognize display 348, and then display sign language performance 350 using the AR glasses, such that sign language performance 350 appears to the viewer to be a PiP overlay on display 348. The PiP overlay may start in a default location, such as off to the side, and then the location can be later customized. The AR glasses may track the display screen and move the PiP overlay as the viewer moves, such that the viewer always sees the PiP overlay at the same location relative to display 348. The AR glasses may also track primary content 312 being displayed on display 348 and move the PiP overlay as the content changes on display 348 to avoid occluding salient regions of primary content 312 being displayed on display 348.

The implementation shown in FIG. 3B enables one or more users of user system 340 to receive sign language performance 350 while advantageously rendering sign language performance 350 undetectable to other users. Alternatively, or in addition, in implementations in which sign language performance 350 is performed by an animated model, the implementation shown in FIG. 3B advantageously may enable different users to select different animated models to perform sign language performance 350. In some implementations, for example, a user of the AR glasses may select from among pre-rendered performances of sign language performance 350 by different animated models. In those implementations, the user selected performance may be transmitted to the AR glasses by system 100 or user system 340. Alternatively, in some implementations, system 100 or user system 340 may render a user selected performance dynamically and in real-time with respect to playout of primary content 312, and may output that render to the AR glasses. In yet other implementations, the AR glasses may be configured to render the performance of sign language performance 350 dynamically, using facial points and other digital character landmarks for animating sign language performance 350 received from system 100 or user system 340.

FIG. 3C shows another exemplary implementation in which an accessibility enhancement to primary content 312 is visible to one or more, but less than all of the viewers of primary content 312. In addition to the features shown in FIG. 3A, FIG. 3C includes personal device 360 in the form of a smartphone including display 368 providing a second display screen for use by a viewer of user system 340. In the implementation shown in FIG. 3C, sign language performance 350 is rendered on display 368 of personal device 360 and is synchronized with playback of primary content 312 on display 348 of user system 340. Synchronization of sign language performance 350 with playout of primary content 312 may be performed periodically, using predetermined time intervals between synchronizations, or may be performed substantially continuously.

Personal device 360 may take the form of a smartphone, tablet computer, game console, smartwatch, or other wearable or otherwise smart device, to name a few examples. Display 368 providing the second display screen for a user of user system 340 may be implemented as an LCD, LED display, OLED, display, QD display, or any other suitable display screen that performs a physical transformation of signals to light.

In some implementations, facial points and other digital character landmarks for performing sign language performance 350 dynamically using an animated model may be included in an accessibility track transmitted to personal device 360 using a separate communication channel than that used to send and receive primary content 312. In one such implementation, the accessibility track including data for use in performing sign language performance 350 may be generated by software code 108 on system 100, and may be transmitted to personal device 360 wirelessly, such as via a 4G or 5G wireless channel. In other implementations, the accessibility track including data for use in performing sign language performance 350 may be generated locally on user system 340 by software code 208, executed by processing hardware 244, and may be transmitted to personal device 360 via one or more of WiFi, Bluetooth, ZigBee, and 60 GHz wireless communications methods.

As in FIG. 3B, the implementation shown in FIG. 3C enables one or more viewers of user system 340 to receive sign language performance 350 while advantageously rendering sign language performance 350 undetectable to other viewers. Alternatively, or in addition, in implementations in which sign language performance 350 is performed by an animated model, the implementation shown in FIG. 3C advantageously may enable different viewers of primary content 312 to select different animated models to perform sign language performance 350. In some implementations, for example, a user of personal device 360 may select from among pre-rendered performances of sign language performance 350 by different animated models. In those implementations, the user selected performance may be transmitted to personal device 360 by system 100 or user system 340. Alternatively, in some implementations, system 100 or user system 340 may render a user selected performance dynamically and in real-time with respect to playout of primary content 312, and may output that render to personal device 360. In yet other implementations, personal device 360 may be configured to render the performance of sign language performance 350 dynamically, using facial points and other digital character landmarks for performing sign language performance 350 received from system 100 or user system 340.

Figure 3D:
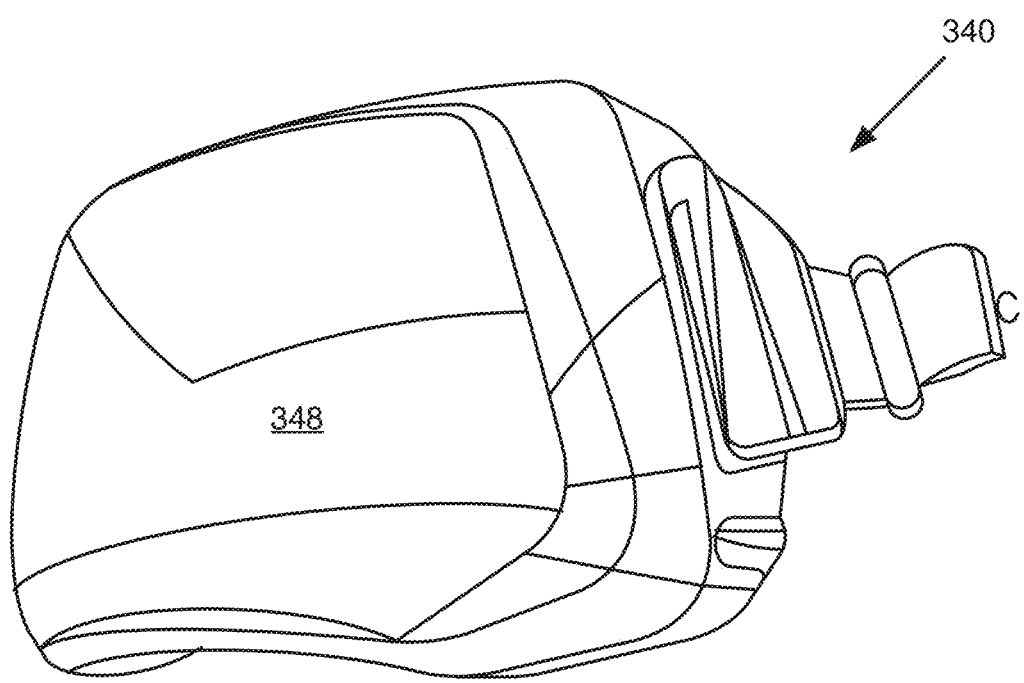
FIG. 3D shows another exemplary system for providing accessibility enhanced content.

FIG. 3D shows an implementation of user system 340 in the form of a VR headset including display 348. In various implementations, facial points and other digital character landmarks for performing sign language performance 350 dynamically using an animated model may be transmitted to the VR headset using a separate communication channel than that used to send and receive primary content 312. In one such implementation, the data for use in performing sign language performance 350 may be generated by software code 108 on system 100, and may be transmitted to the VR headset wirelessly, such as via a 4G or 5G wireless channel. In other implementations, the data for use in performing sign language performance 350 may be generated locally on user system 340 in the form of a VR headset, by software code 208, executed by processing hardware 244, and may be rendered on display 348 of the VR headset.

In implementations in which sign language performance 350 is performed by an animated model, the implementation shown in FIG. 3D advantageously may enable different viewers of primary content 312 to select different animated models to perform sign language performance 350. In some implementations, for example, a user of the VR headset may select from among pre-rendered performances of sign language performance 350 by different animated models. In those implementations, the user selected performance may be transmitted to the VR headset by system 100.

In addition to the exemplary implementations shown in FIGS. 1, 2, 3A, 3B, 3C, and 3D, in some implementations, sign language performance 350 may be rendered for some or all users of user system 140a-140c/240/340 using a lenticular projection technique in which dual video feeds are generated, one presenting primary content 112/212/312 and the other presenting sign language performance 350. In some implementations employing such a lenticular technique, sign language performance 350 may be visible to all users of user system 140a-140c/240/340, while in other implementations, customized eyewear could be used to render sign language performance 350 visible only to those users utilizing the customized eyewear.

In some implementations, content source 110/210 may create or outsource creation of sign language performance 350 corresponding to primary content 112/212/312. In some of those implementations, for example, the accessibility track including sign language performance 350 may be contained in a Digital Cinema Package (DCP) in a manner consistent with the Digital Cinema Initiates (DCI) specification, which does not specifically provide blocks for sign language. In those implementations, DCP encryption, DCP delivery, and key delivery may be performed in typical fashion. Moreover, a cinema presenting primary content 112/212/312 and the accessibility trach including sign language performance 350 can provide hearing impaired viewers with personal devices for viewing sign language performance 350 alongside primary content 112/212/312.

The functionality of system 100 and software code 108 shown in FIG. 1 will be further described by reference to FIG. 4. FIG. 4 shows flowchart 470 presenting an exemplary method for delivering accessibility enhanced content, according to one implementation. With respect to the method outlined in FIG. 4, it is noted that certain details and features have been left out of flowchart 470 in order not to obscure the discussion of the inventive features in the present application.

Referring to FIG. 4 in combination with FIG. 1, flowchart 470 begins with delivering, to one or more of user systems 140a-140c, accessibility enhanced content 120 including primary content 112 and an accessibility track synchronized to primary content 112, wherein the accessibility track includes at least one of a sign language performance, or one or more video tokens each expressing one or more words (action 472). In various implementations, the accessibility track delivered to one or more of user systems 140a-140c may be synchronized with the timecode of primary content 112, a subtitle track of primary content 112, an audio track of primary content 112, or to individual frames or sequences of frames of primary content 112.

As noted above, primary content 112 may include content in the form of video games, music videos, animation, movies, or episodic TV content that includes episodes of TV shows that are broadcasted, streamed, or otherwise available for download or purchase on the Internet or via a user application. Alternatively, or in addition, primary content 112 may be or include digital representations of persons, fictional characters, locations, objects, and identifiers such as brands and logos, for example, which populate a VR, AR, or MR environment. Moreover, in some implementations primary content 112 may depict virtual worlds that can be experienced by any number of users synchronously and persistently, while providing continuity of data such as personal identity, user history, entitlements, possessions, payments, and the like. As also noted above, primary content 112 may be or include content that is a hybrid of traditional audio-video and fully immersive VR/AR/MR experiences, such as interactive video.

As shown in FIG. 1, in some implementations, primary content 112 may be delivered to one or more user systems 140a-140c by system 100. In those implementations, accessibility enhanced content 120 comprising primary content 112 and the accessibility track synchronized to primary content 112 may be delivered to one or more of user systems 140a-140c by software code 108, executed by processing hardware 104 of computing platform 102, which may be a computer server, as also noted above.

As described by FIG. 4, when the accessibility track delivered to one or more of user systems 140a-140c, in action 472, includes the sign language performance, the sign language performance is delivered contemporaneously with delivery of primary content 112 (action 474a). As further described by FIG. 4, when the accessibility track delivered to one or more of user systems 140a-140c, in action 472, includes the one or more video tokens, the one or more video tokens are played back when primary content 112 reaches a location corresponding to each of the one or more video tokens (action 474b).

As discussed above by reference to FIGS. 1 and 3A, in some implementations, processing hardware 104 of system 100 may execute software code 108 to broadcast or stream accessibility enhanced content 120/320 comprising primary content 112/312 and the accessibility track synchronized to primary content 112/312 to user system(s) 140a-140c/340. In some of those implementations, the accessibility track may be pre-rendered by system 100 and broadcasted or streamed to user system(s) 140a-140c/340. However, in other implementations in which primary content 112/312 and the accessibility track are broadcasted or streamed to user system(s) 140a-140c/340, processing hardware 104 may execute software code 108 to generate the accessibility track dynamically during the broadcasting or streaming of primary content 112/312.

Referring to FIGS. 2 and 3A processing hardware 244 of user system 240/340 may execute software code 208 to render the accessibility track synchronized to primary content 212/312 on display 248/348 contemporaneously with rendering primary content 212/312 corresponding to the accessibility track.

With respect to the method outlined by flowchart 470, it is noted that, in some implementations, actions 472 and 474a, or actions 472 and 474b, or actions 472, 474a, and 474b, may be performed in an automated process from which human participation may be omitted.

Thus, the present application discloses systems and methods for delivering accessibility enhanced content. From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system for delivering accessibility enhanced content, the system comprising:
   a computer server having a processing hardware and a system memory storing a software code;
   the processing hardware configured to execute the software code to:
   deliver, to a user system, an accessibility enhanced content comprising a primary content and an accessibility track synchronized to the primary content, wherein the accessibility track comprises at least one of (i) a sign language performance performed using an animated model, and an emotive data set utilized to control the animated model to perform emotions or gestures, wherein the emotions or gestures include facial expressions, or (ii) one or more video tokens each expressing one or more words, each of the one or more video tokens being selected from a respective plurality of video tokens for expressing the one or more words;
   wherein when the accessibility track comprises the sign language performance and the emotive data set, the animated model (i) maintains facing a camera during a scene by changing orientation during the scene to continue facing the camera as the camera changes position during the scene, or (ii) maintains facing a feature depicted in the scene as the camera changes position during the scene, and wherein the sign language performance is delivered contemporaneously with delivery of the primary content; and
   wherein when the accessibility track comprises the one or more video tokens, the one or more video tokens are played back when the primary content reaches a location corresponding to each of the one or more video tokens.

2. The system of claim 1, wherein the processing hardware is further configured to execute the software code to:
   deliver the primary content and the accessibility track using a same communication channel.

3. The system of claim 1, wherein the processing hardware is further configured to execute the software code to:
   deliver the primary content and the accessibility track using separate communication channels.

4. The system of claim 1, wherein the accessibility track further comprises one or more haptic effects to be actuated when the primary content reaches a location corresponding to each of the one or more haptic effects.

5. The system of claim 1, wherein the sign language performance or the one or more video tokens is configured to be displayed as a picture-in-picture (PiP) overlay on the primary content.

6. The system of claim 5, wherein when the accessibility track comprises the sign language performance and the emotive data set, the PiP overlay of the sign language performance employs alpha masking to show only a performer of the sign language performance, or the performer having an outline added for contrast.

7. The system of claim 1, wherein the accessibility track is contained in a Digital Cinema Package (DCP).

8. A method for use by a system for delivering accessibility enhanced content, the system including a computer server having a processing hardware and a system memory storing a software code, the software code configured to determine at least one of a speed, a forcefulness or an emphasis with which a sign language performance is performed, the method comprising:
   delivering to a user system, by the software code executed by the processing hardware, an accessibility enhanced content including a primary content and an accessibility track synchronized to the primary content;
   wherein the accessibility track comprises the sign language performance performed using an animated model, and an emotive data set utilized to control the animated model to perform emotions or gestures with the at least one of the determined speed, forcefulness or emphasis, wherein the emotions or gestures include facial expressions, wherein the animated model (i) maintains facing a camera during a scene by changing orientation during the scene to continue facing the camera as the camera changes position during the scene, or (ii) maintains facing a feature depicted in the scene as the camera changes position during the scene, and wherein the sign language performance is delivered contemporaneously with delivery of the primary content.

9. The method of claim 8, further comprising delivering the accessibility track and the primary content using a same communication channel.

10. The method of claim 8, further comprising delivering the accessibility track and the primary content using separate communication channels.

11. The method of claim 8, wherein the accessibility track further comprises one or more haptic effects to be actuated when the primary content reaches a location corresponding to each of the one or more haptic effects.

12. The method of claim 8, wherein the sign language performance is configured to be displayed as a picture-in-picture (PiP) overlay on the primary content.

13. The method of claim 12, wherein the PiP overlay of the sign language performance employs alpha masking to show only a performer of the sign language performance, or the performer having an outline added for contrast.

14. The method of claim 8, wherein the accessibility track is contained in a Digital Cinema Package (DCP).

15. The system of claim 1, wherein each of the one or more video tokens comprises a pre-produced video, and wherein each of the one or more video tokens expresses a single word sign, a sequence of signs, or a shorthand representation of a sequence of signs.

16. A system for delivering accessibility enhanced content, the system comprising:
   a computer server having a processing hardware and a system memory storing a software code;
   the processing hardware configured to execute the software code to:
   deliver, to a user system, an accessibility enhanced content comprising a primary content and an accessibility track synchronized to the primary content, wherein the accessibility track comprises a sign language performance performed using an animated model;
   wherein when the accessibility track comprises the sign language performance performed using an animated model, the animated model (i) maintains facing a camera during a scene by changing orientation during the scene to continue facing the camera as the camera changes position during the scene, or (ii) maintains facing a feature depicted in the scene as the camera changes position during the scene, and wherein the sign language performance is delivered contemporaneously with delivery of the primary content.

* * * * *